United States Patent
Chen et al.

(10) Patent No.: US 7,705,849 B2
(45) Date of Patent: Apr. 27, 2010

(54) INTELLIGENT LAMM SCHEMATICS

(75) Inventors: Eric Y. Chen, San Gabriel, CA (US);
Gaylord P. Reese, Irvine, CA (US);
Peter Liu, Temple City, CA (US); Dinh Le, Garden Grove, CA (US); Anthony Tran, Garden Grove, CA (US)

(73) Assignee: The Boeing Company, Chicago, IL (US)

( * ) Notice: Subject to any disclaimer, the term of this patent is extended or adjusted under 35 U.S.C. 154(b) by 491 days.

(21) Appl. No.: 11/680,651

(22) Filed: Mar. 1, 2007

(65) Prior Publication Data

US 2008/0234986 A1    Sep. 25, 2008

(51) Int. Cl.
*G06T 15/70* (2006.01)

(52) U.S. Cl. .................. 345/473; 345/474; 345/475; 703/1; 703/2; 703/6; 716/1; 716/4; 716/11; 716/18

(58) Field of Classification Search ............... 345/473, 345/474, 475; 703/1, 2, 6; 716/1, 4, 11, 716/18
See application file for complete search history.

(56) References Cited

U.S. PATENT DOCUMENTS

| | | | |
|---|---|---|---|
| 5,970,437 A * | 10/1999 | Gorman et al. | 702/184 |
| 6,675,366 B1 * | 1/2004 | Nolan | 716/11 |
| 7,263,674 B2 * | 8/2007 | Lorenz | 716/4 |
| 7,478,352 B2 | 1/2009 | Chaplin et al. | |
| 2006/0214947 A1 | 9/2006 | Boose et al. | |
| 2007/0141899 A1 | 6/2007 | Saini et al. | |
| 2007/0180421 A1 | 8/2007 | Boose | |
| 2008/0082948 A1 | 4/2008 | Boose | |
| 2008/0189596 A1 | 8/2008 | Hadley et al. | |

* cited by examiner

*Primary Examiner*—Kimbinh T Nguyen
(74) *Attorney, Agent, or Firm*—Yee & Associates, P.C.; Baldwin D. Quan

(57) ABSTRACT

A computer implemented method and computer usable program code for interacting with a system schematic. A system schematic having a plurality of components is graphically displayed. In response to receiving a selection of a control component, a state of the control component is altered. A set of effector components from the plurality of components are animated using a cause-and-effect relationship between the control component and the set of effector components are animated.

20 Claims, 6 Drawing Sheets

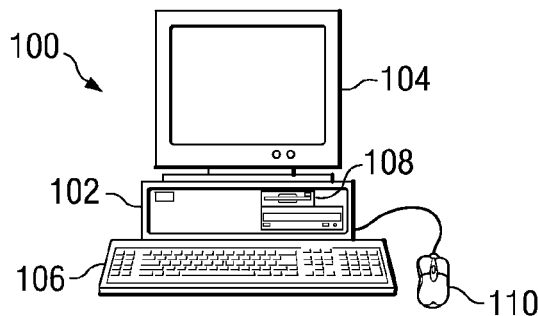
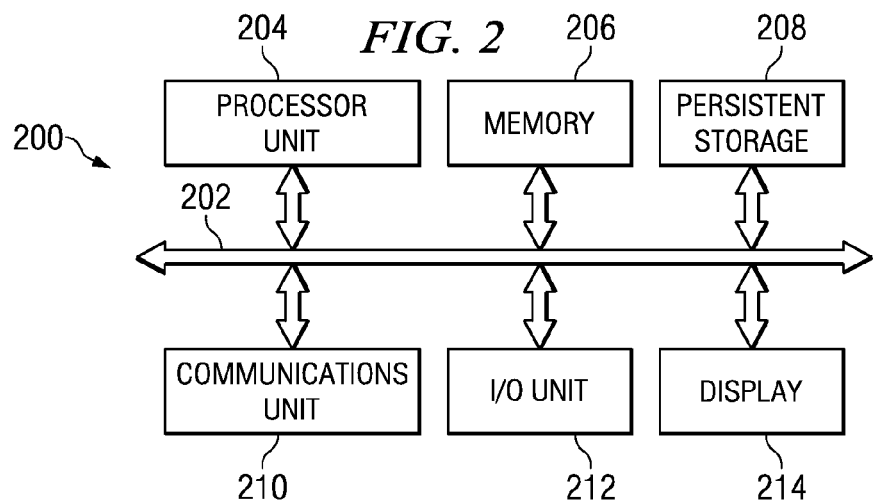
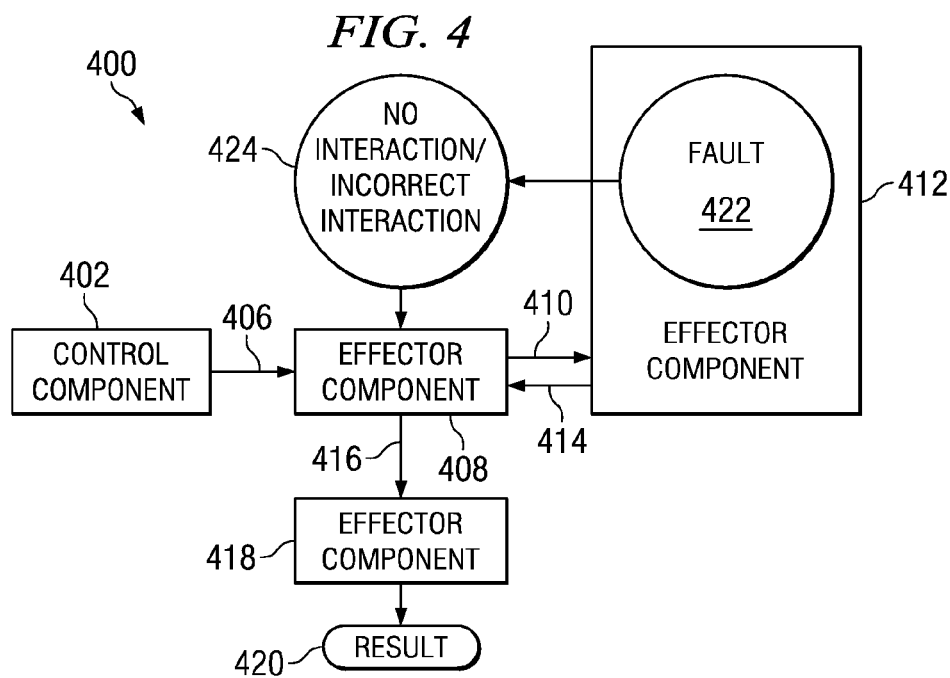

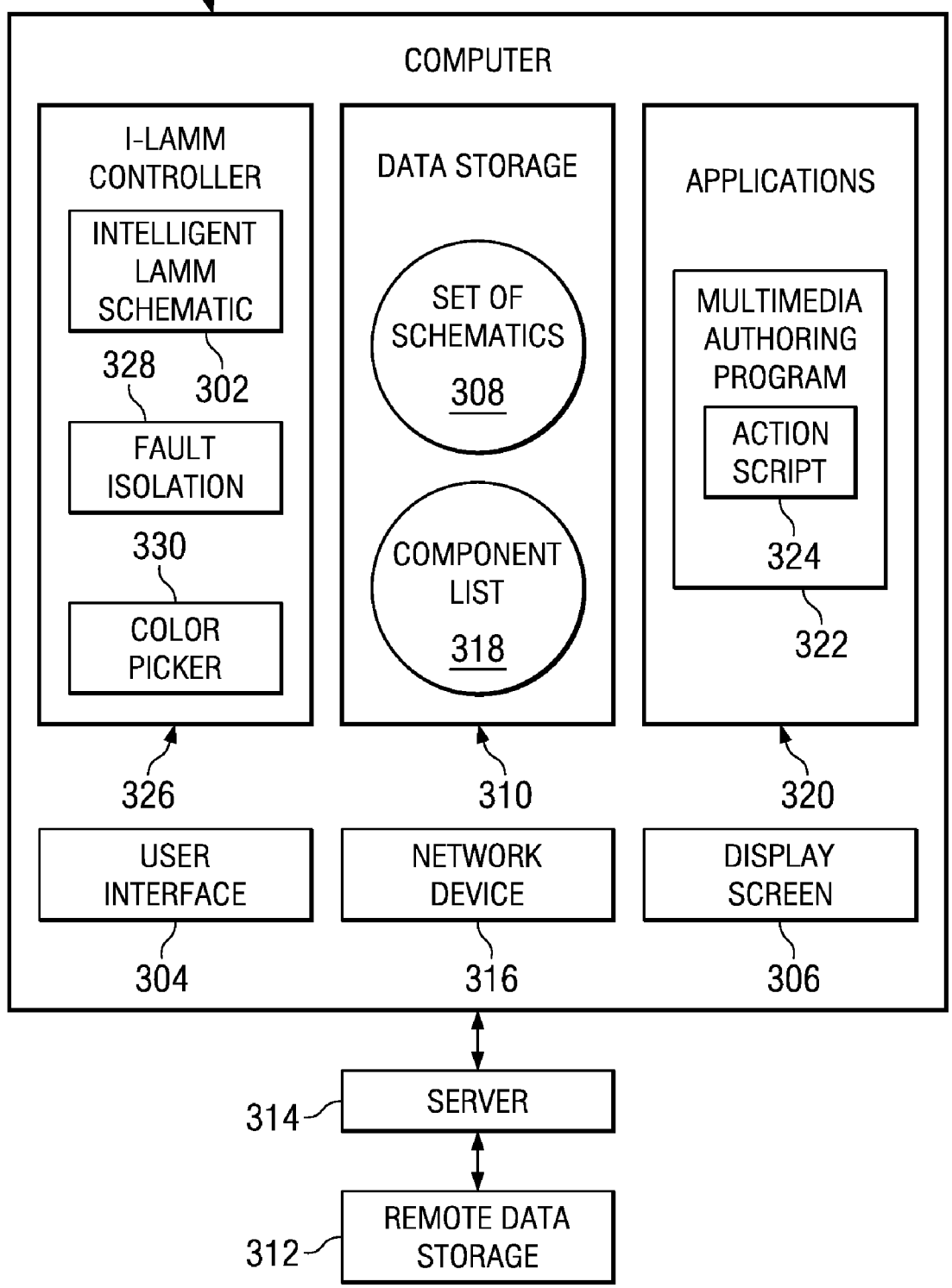

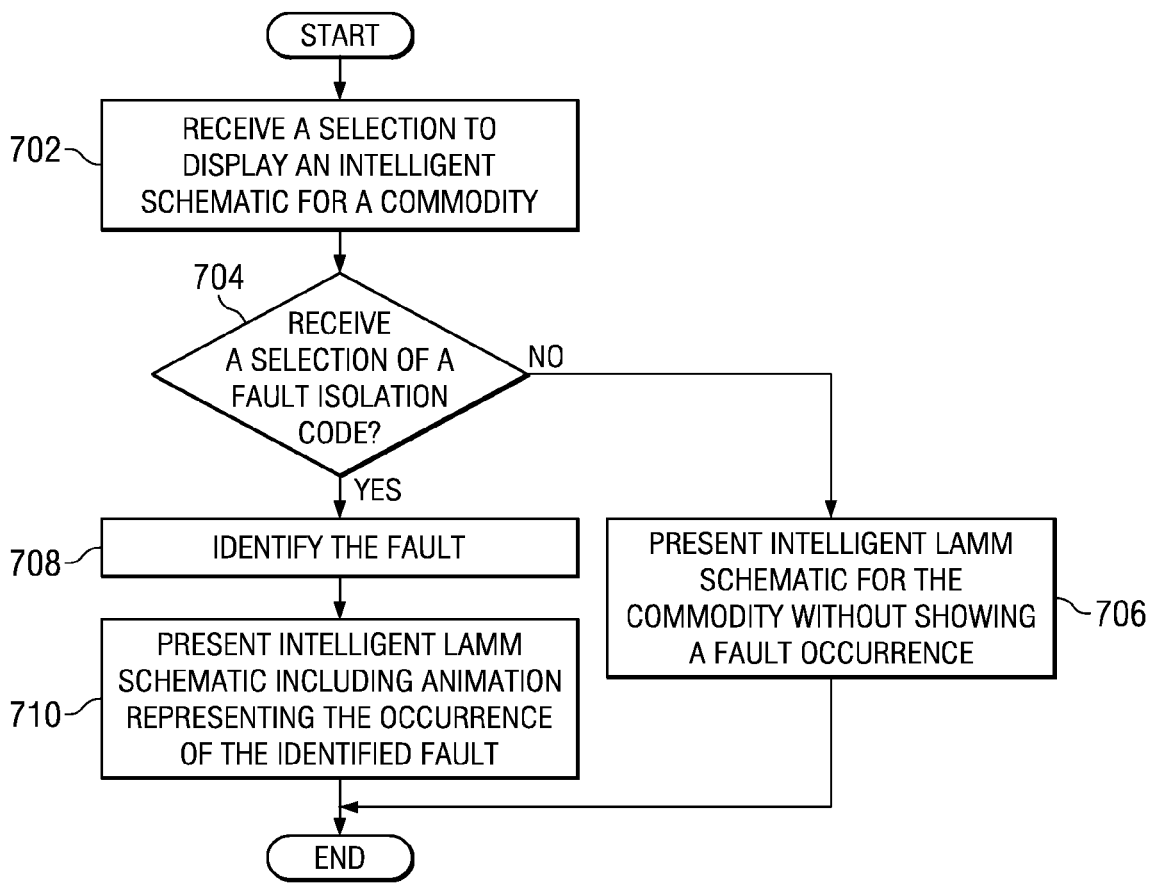

INTELLIGENT LAMM SCHEMATICS

BACKGROUND

1. Technical Field

The disclosure relates generally to an improved data processing system and in particular to displaying schematics. Still more particularly, the disclosure relates to a computer implemented method, apparatus, and computer usable program code for generating interactive, functionally integrated, system-oriented schematics.

2. Description of the Related Art

Lamm Schematics, created by L. M. Lamm, are aircraft systems oriented diagrams used to depict aircraft system functions for use during design, maintenance, training, and fault isolation in aircraft systems. Lamm schematics show interfaces between systems, such as electrical, electronic, mechanical, pneumatic, and hydraulic systems. Lamm schematics may be used by technicians, pilots, training instructors, mechanics, and engineers for familiarization of aircraft systems.

However, schematics and manuals, such as Lamm schematics, are typically only made available in paper format. Schematics in paper format are not interactive and require a lot of reading from possibly multiple chapters of an information source, and possibly multiple information sources, to obtain an understanding of systems interactivity. An information source refers to a schematic, a manual, technical manual, parts catalog, or any other source of information regarding parts or systems.

A reader may be required to interpret various information sources to obtain some understanding of the interaction of different systems with one another. In some cases, a user may be unable to grasp the interactions and interdependence of every operable component in a commodity due to the burdensome process of reading through voluminous hard copy technical manuals and schematics in order to obtain an understanding of the interaction of different systems.

Currently, some schematics and manuals may be available to users in electronic form. For example, interactive electronic technical manuals (IETMs) are technical manuals in electronic form designed to take the place of paper technical manuals. However, many of these electronic manuals are merely paper products provided on a CD with linking capability and nothing more. In other words, some electronic maintenance documents are nothing more than an attempt to adhere to a paper product concept in an electronic form.

Intelligent wiring graphics are technical manuals that may depict some basic wiring highlights and switch movement in electrical systems. However, intelligent wiring graphics manuals are generally only enhanced wiring diagrams that do not display the interchange between different systems and components. In other words, intelligent wiring graphics do not depict interactions and interconnections of electrical system wiring with other systems, such as hydraulic and pneumatic systems.

Therefore, it would be advantageous to have an improved computer implemented method and computer usable program code for generating and displaying interactive, functionally integrated, system-oriented schematics.

SUMMARY

One embodiment of the disclosure provides a computer implemented method for displaying a system schematic. Schematic display parameters are configured for the system schematic. Configuring schematic display parameters includes identifying an intelligence level of the schematic. The system schematic, having a plurality of components, is graphically displayed. In response to receiving a selection of a control component, a state of the control component is altered. A set of effector components from the plurality of components are animated using a cause-and-effect relationship between the control component and the set of operable effector components. The set of effector components includes any component that is affected through the cause-and-effect chain.

Animating the set of effector components may include animating a flow of electrical conductivity through an electrical system, animating mechanical movement, and/or animating pneumatic and fluid flow through the system. In another embodiment, the selected control component of the system schematic is also animated. In another embodiment, a predetermined fault condition of the system schematic is selected.

In another advantageous embodiment, a computer implemented method providing an intelligent Lamm schematic for a system is provided. A plurality of components for the system is graphically displayed. A user input selecting a first component from the plurality of components is received. Selecting the first component initiates a cause-and-effect chain through a set of operable components in the plurality of components. The first component is animated based on a function of the first component. A second component from the set of operable components is animated based on a function of the second component and an interaction between the first component and the second component. A next component from the set of operable components is animated based on a function of the next component and an interaction of the next component with one or more other components, until all components in the cause-and-effect chain are animated.

In another embodiment, a selection of a fault isolation code is received. A fault in a component associated with the selected fault isolation code is identified to form a fault component. The fault component is animated in accordance with a function of the fault component, the identified fault, and an interaction of the fault component with one or more other components. Animating the fault component depicts a fault occurrence. In response to animating the fault component, a next component from the set of operable components is animated based on a function of the next component and the fault occurrence.

In another illustrative embodiment, a computer program product having computer usable program code encompasses the steps for displaying a system schematic. The computer program product is executed to perform the steps in the method.

The features, functions, and advantages can be achieved independently in various embodiments of the disclosure or may be combined in yet other embodiments.

BRIEF DESCRIPTION OF THE DRAWINGS

The appended claims set forth the novel features believed characteristic of the embodiments. The disclosure itself, however, as well as a preferred mode of use, further objectives and advantages thereof, will best be understood by reference to the following detailed description of an advantageous embodiment when read in conjunction with the accompanying drawings, wherein:

FIG. 1 is an exemplary illustration of a data processing environment in which advantageous embodiments may be implemented;

FIG. 2 is an illustration of a data processing system in accordance with an advantageous embodiment;

FIG. 3 is an illustration of a data flow through a computer system used to generate an intelligent Lamm schematic in accordance with an advantageous embodiment;

FIG. 4 is an illustration of the components of an intelligent Lamm schematic in accordance with an advantageous embodiment;

FIG. 7 is a flowchart of a process for displaying an intelligent Lamm schematic in accordance with an advantageous embodiment.

DETAILED DESCRIPTION

Figure 5A:
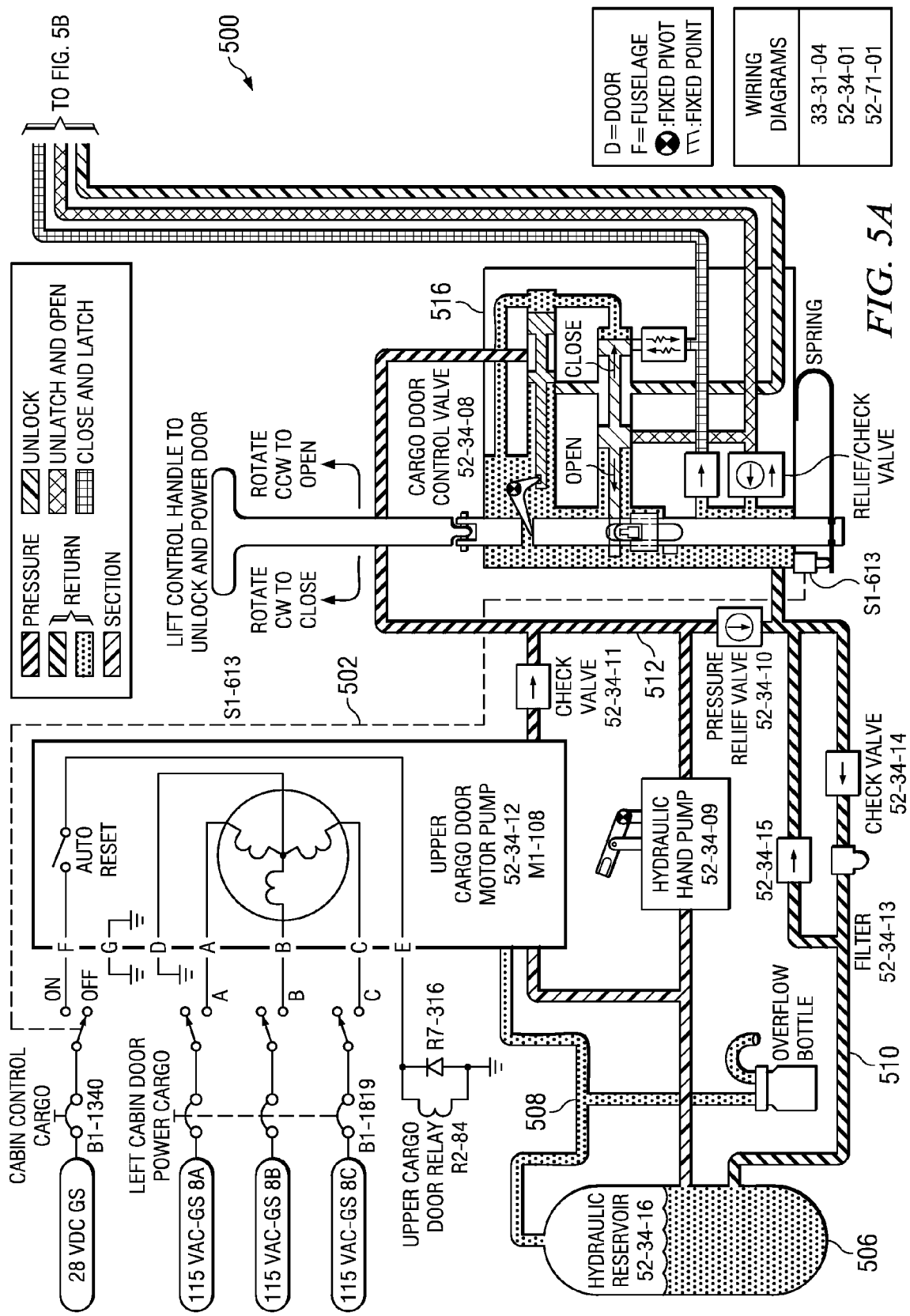
FIG. 5A is an illustration of an intelligent Lamm schematic for a cargo door on an aircraft in accordance with an advantageous embodiment.

With reference now to the figures and in particular with reference to FIG. 1, a pictorial representation of a data processing system is shown in which illustrative embodiments may be implemented. Computer 100 may include system unit 102, video display terminal 104, keyboard 106, storage devices 108, which may include hard disk drives, floppy drives, flash memory, and other types of permanent and removable storage media, and mouse 110. Additional input devices may be included with personal computer 100. Examples of additional input devices include a joystick, touchpad, touch screen, trackball, microphone, and the like. Storage devices 108 may be used to store a set of schematics for a commodity.

As used herein, a commodity is any item, system, machine, equipment or device having one or more parts and/or interrelated systems. The item may be, for example, equipment or a system. Specific examples of a commodity may be, but are not limited to, an airplane, a motor vehicle, a ship, a network data processing system, a satellite, a radar detection system, or any other type of machine. A commodity may also include an assembly, sub-assembly, part, subpart, or subsystem of an equipment, device, or machine. For example, a commodity may be an assembly for opening and closing a hatch on an aircraft, an assembly for lowering landing gear on a plane, an engine in an aircraft, or a radio in an aircraft cockpit.

A set of schematics for a commodity may include one or more schematics for a commodity. A schematic may be in paper form or electronic form. If the schematic is in paper form, the schematic may be converted to an electronic form in accordance with any known or available method for converting information for the schematic in the paper format to an electronic form for input into computer 100, including, but not limited to, manually inputting data into computer 100 and/or scanning information into computer 100. Schematics in an electronic form may be obtained from a hard disk, a floppy disk, a CD-ROM, a flash memory storage device, or any other data storage media or data storage device.

An electronic schematic may also be obtained by downloading a schematic from a resource on a network, such as a file transfer protocol (FTP) document. In this example, computer 100 is not connected to a network. However, in other embodiments, computer 100 may be implemented in a computer network. A network may include an intranet, the Internet, a local area network (LAN), a wide area network (WAN), an Ethernet, or any other type of known or available network of computer hardware and/or software.

A schematic may have multiple components and assemblies. Alternatively, a schematic may be for a commodity having a single component or assembly. For example, a schematic may be a schematic for an electrical system, a hydraulic system, and/or a mechanical system associated with one or more components of a commodity.

As used herein, a component may include hardware components and/or software components. A hardware component may include one or more assemblies, sub-assemblies, parts, and/or subparts. Likewise, a subpart may also include nested subparts, which may be referred to as sub-subparts. For example, a component may be a swivel assembly, a switch, a wire, an actuator, a valve, a hose, a pipe, a handle, a pump, a spring, a cylinder, a latch, or any other assembly, sub-assembly, part, subpart, or nested subpart.

Although the depicted representation shows a personal computer, other embodiments may be implemented in other types of data processing systems. For example, computer 100 may be any type of general computing device, including, but not limited to, a desktop computer, a laptop computer, a tablet PC, a personal digital assistant (PDA), or any other type of computer.

Computer 100 also preferably includes a graphical user interface (GUI) that may be implemented by means of systems software residing in computer readable media in operation within computer 100. The graphical user interface may be implemented to display intelligent schematics to a user in accordance with the illustrative embodiments of the disclosure.

Turning now to FIG. 2, an illustration of a data processing system is depicted in accordance with an advantageous embodiment. Data processing system 200 is an example of a data processing system that may be used to implement different processes for an advantageous embodiment in a processor unit.

Data processing system 200 may be used to implement different computers, such as, for example, computer 100 in FIG. 1. In this illustrative example, communications fabric 202 provides communications between processor unit 204, memory 206, persistent storage 208, communications unit 210, I/O unit 212, and display 214. Communications fabric 202 in these examples takes the form of a bus. Of course, communications fabric 202 may take any form that provides communications between the different components of data processing system 200.

Processor unit 204 executes instructions for software that may be loaded into memory 206. Processor unit 204 may be a set of one or more processors or may be a multi-processor core depending on the particular implementation. Memory 206, in these examples, may be, a random access memory. Persistent storage 208 may take various forms depending on the particular implementation. For example, persistent storage 208 may be, without limitation, a hard drive, a flash memory, a rewritable optical disk, a rewritable magnetic tape, or some combination of the above.

Communications unit 210, in these examples, provides for communications with other data processing systems or devices. In these examples, communications unit 210 may be, without limitation, a network interface card. I/O unit 212 allows for input and output of data with other devices that may be connected to data processing system 200. For example, I/O unit 212 may provide a connection for user input though a keyboard and mouse. Further, I/O unit 212 may send output to a printer. Display 214 provides a mechanism to display information to a user.

Instructions for the operating system, the object-oriented programming system, and applications or programs are located on persistent storage 208. These instructions may be loaded into memory 206 for execution by processor unit 204. The processes of the illustrative embodiments may be performed by processor unit 204 using computer implemented instructions, which may be located in a memory, such as memory 206.

Aircraft and other equipment and machines are becoming increasingly complex while greater pressure to decrease the amount of time required to train technicians and perform maintenance on aircraft and other commodities is also growing.

The illustrative embodiments recognize a need for an interactive functionally integrated, electronic systems schematic that can be compatible with network-centric operations (NCO). Network-centric operations may also be referred to as network-centric warfare (NCW), is a theory for obtaining a competitive advantage through robust networking of geographically dispersed resources. The illustrative embodiments also recognize that as systems become increasingly interconnected and interdependent, the technicians who maintain those complicated multi-integrated systems in the future will need to be able to obtain functionally integrated and interactive schematics to manage and troubleshoot those multi-integrated systems.

The illustrative embodiments also recognize that reading and comprehension in the youth of today may be declining. Students today are increasingly dependent on visual learning rather than research and site reading. The generation of children growing up in the environment of video games and graphics-oriented computer applications may become the engineers, mechanics, technicians, and aircraft designers of tomorrow. That generation will cognitively process aircraft engineering, flying, and maintenance in a very different way than is the current norm. That generation may need to visualize various systems and the manner in which the systems and components interact in a faster manner than ever before.

The illustrative embodiments also recognize that intelligent wiring graphics do not provide an interactive, integrated view of multiple systems operating and interacting with other systems and components in real-time. In addition, currently available intelligent wiring graphics do not provide a view of systems components including malfunctions and/or faults. In other words, intelligent wiring graphics cannot be used to build in failure and fault isolation. Currently available intelligent wiring graphics do not provide a view of components and systems interacting during the occurrence of a fault.

Therefore, advantageous embodiments of the disclosure provide a computer implemented method, apparatus, and computer usable program code for displaying a system schematic. Schematic display parameters may be configured for the system schematic. Configuring schematic display parameters includes, for example, identifying an intelligence level of the schematic.

The intelligent Lamm schematic may be graphically displayed having a plurality of components of the system. In response to receiving a selection of a control component, a state of the control component is altered. A set of effector components from the plurality of components may be animated. The set of effector components may be components that are operable based on the selected control component and a cause-and-effect relationship between the control component and the set of operable effector components. The set of effector components includes any component that is affected through the cause-and-effect chain.

The cause-and-effect chain is the chain of interactions occurring between two or more components in a commodity. In these examples, the interactions occur when the commodity is in operation. For example, if a user flips a light switch to the on position, an electrical current is sent through an electrical wire until it reaches a light bulb socket. When the current reaches the light bulb, the light bulb is illuminated. In this example, the cause-and-effect chain is the chain of interactions between the light switch component, the electrical wire component, the light socket, and the light bulb.

FIG. 3 is an illustration of a data flow through a computer system used to generate an intelligent Lamm schematic in accordance with an advantageous embodiment. Computer 300 may be implemented using any type of computing device, such as a personal computer, laptop, personal digital assistant, or any other computing device depicted in FIGS. 1 and 2. In this example, computer 300 is a computing device, such as computer 100 in FIG. 1.

A user uses computer 300 to generate intelligent Lamm schematic 302. In this depicted example, intelligent Lamm schematic 302 may be a schematic that is interactive, functionally integrated, and electronic system schematic. Intelligent Lamm schematic 302 displays the integration of operations of various systems, all related components, functional logic flows from command inputs to performance outputs, all line-replaceable units (LRUs), and/or all pneumatic, fluids and electronic movements. In other words, intelligent Lamm schematic 302 is an animated, real-time representation of the functioning and interactivity of all components in a commodity during operation of the commodity, as specified by the specifications for the commodity. Intelligent Lamm schematic 302 depicts changes in state and movement of components based on the function of each component and interactions of each component with one or more other components in the cause-and-effect chain that occurs when the commodity is in operation.

The user selects the types of features that will be present in intelligent Lamm schematic 302. For example, without limitation, an intelligent Lamm schematic may have varying levels of depth or detail, include options for displaying part numbers, commercial and government entity (CAGE) codes, and other part-related data for components represented in the intelligent Lamm schematic, and/or include options for linking to documents, files, or data sources that are independent of the intelligent Lamm schematic. CAGE codes are manufacturer codes for parts.

For example, a user may choose to link intelligent Lamm schematic 302 to one or more manufacturer parts catalogs or manufacturer websites. In such a case, when a user is viewing intelligent Lamm schematic 302, a user may select to view a linked manufacturer parts catalog associated with one or more components in intelligent Lamm schematic 302.

Likewise, a user may choose to link one or more components depicted in intelligent Lamm schematic 302 to additional parts data, such as part numbers, CAGE codes, manufacturer identification, manufacturer contact information, reference designator numbers, substitute part numbers, and/or any other information related to a given commodity.

The user selects the types of features for incorporation in intelligent Lamm schematic 302 via user interface 304. User interface 304 is any type of known or available interface for providing input to computer 300, including but not limited to, a graphical user interface (GUI), a menu-driven interface, a command line interface, a voice recognition system, keyboard 106 and mouse 110, as shown in FIG. 1, a touch screen, or any other type of interface to permit a user to enter data as input and receive data as output. User interface 304 may include display screen 306. Display screen 306 is an output device for displaying output to a user. After generation of intelligent Lamm schematic 302, intelligent Lamm schematic 302 may be displayed to the user on display screen 306.

After identifying features for inclusion in intelligent Lamm schematic 302, the user identifies which schematics will be used to create intelligent Lamm schematic 302. The identified schematics form a set of schematics 308, which may include one or more schematics. Thus, a user can select which schematics the user wishes to incorporate into intelligent Lamm schematic. In this example, set of schematics 308 is a set of one or more schematics. The schematics in set of schematics 308 may include any type of schematics, including, without limitation, Lamm schematics, interactive electronic technical manual (IETM), or any other electronic form of technical manual. Set of schematics 308 are stored on data storage 310.

Data storage 310 is any type of known or available data storage device, including, but not limited to, a hard drive, main memory, a flash memory, read only memory (ROM), random access memory (RAM), a CD-ROM, a floppy disk, a database, or any other type of data storage device. In this example, data storage 310 is a schematics database on a hard disk on computer 300. Data storage 310 is located on or locally to computer 300.

Data storage 310 may also be located remotely to computer 300. For example, remote data storage 312 is a data storage device located remotely to computer 300 on server 314. Computer 300 can access server 314 and remote data storage 312 by means of network device 316.

Network device 316 is any type of network access software known or available for allowing computer 300 to access a network. Network device 316 connects to a network connection or network access point. The network connection permits access to any type of network, such as, without limitation, a local area network (LAN), a wide area network (WAN), Intranet, Ethernet, or the Internet. For example, network device 316 may be a wireless network adapter for connecting to a wireless access point (WAP) to obtain access to a wireless network.

The user may also obtain an electronic copy of component list 318 for use in generating intelligent Lamm schematic 302. Component list 318 is a master component list of one or more components depicted in intelligent Lamm schematic 302. For example, component list 318 may include a list of all components to be included in intelligent Lamm schematic 302, part numbers for each part and nested sub-part, commercial and government entity (CAGE) code data for each part, and any other data regarding a component or part associated with a component. Component list 318 is stored in data storage 310 and/or remote data storage 312. Component list 318 is imported into multimedia authoring program 322, such as Adobe® Flash® professional 8 or into a database. Component list 318 is retrieved via action script 324 when the user wants to display the information.

Applications 320 may include one or more drawing programs and/or scripting languages for creating animated content for interactive documents and web applications.

Applications 320 may be used to generate intelligent Lamm schematic 302 from set of schematics 308 and component list 318. In this example, applications 320 includes multimedia authoring program 322. Multimedia authoring program 322 is an authoring environment for creating interactive websites, web applications, and animated graphics content. In this example, multimedia authoring program 322 is Adobe® Flash® Professional 8 or Adobe® illustrator. However, any multimedia authoring program may be used, including, but not limited to, Adobe® Flash.

A user may import a file containing set of schematics 308 into multimedia authoring environment of multimedia authoring program 322, such as Adobe® illustrator. The user may use multimedia authoring program 322 to combine set of schematics 308 to form a single schematic.

In this example, multimedia authoring program 322 includes Adobe® illustrator. A user may use Adobe® illustrator to edit or clean up the combined schematic. In this example, multimedia authoring program 322 also includes Flash® professional 8. A user may use Flash® professional 8 to convert each component in the combined schematic into a symbol.

Multimedia authoring program 322 also may include action script 324. Action script 324 is a script based programming language for creating animated content. Action script 324 may be used to add intelligence to the combined schematic to form intelligent Lamm schematic 302. Action script 324 may be added to each symbol representing a component in the combined schematic. Action script 324 may also link each symbol to an external file or website.

A user may use action script 324 in conjunction with multimedia authoring environment 322 to add animation, such as hydraulic flow, mechanical movement, and electrical flow to the schematic. Finally, a user uses action script 324 to add logic for the flow and any selected fault scenarios to the schematic to complete intelligent Lamm schematic 302. Action script 324 animates each component in the schematic to move or change based on a function for each component and an interaction of each component with one or more other components in a cause-and-effect chain. In this manner, intelligent Lamm schematic 302 does not just animate the function of a component, but also based on the interactions of each component with one or more other components in the cause-and-effect chain. Thus, if intelligent Lamm schematic 302 is used to depict the operation of a commodity in which a user has selected a fault isolation feature, intelligent Lamm schematic 302 may show each component function as that component's function is affected by the selected fault, as discussed in greater detail below.

I-Lamm controller 326 is a software component for managing, controlling, and displaying intelligent Lamm schematic 302. I-Lamm controller 326 is the set of algorithms and logic added to a set of schematics for accessing databases to provides information related to intelligent Lamm schematic 302, linking to data external to intelligent Lamm schematic 302, and controlling animation of a cause-and-effect chain of events. In other words, I-Lamm controller 326 is the intelligence added to set of schematics 308 to create intelligent Lamm schematic 302.

A user can request display of intelligent Lamm schematic 302 by selecting to display intelligent Lamm schematic 302 by means of user interface 304. In response to receiving a selection to display intelligent Lamm schematic 302, I-Lamm controller 326 displays intelligent Lamm schematic 302 on display screen 306.

I-Lamm controller 326 also may include fault isolation 328. Intelligent Lamm schematic 302 can be programmed with fault isolation codes. Fault isolation 328 is a software component for determining whether one or more fault isolation codes associated with intelligent Lamm schematic 302 has been selected. A fault isolation code is a code corresponding to a given fault. A fault isolation code may be used to identify a particular fault.

For example, a fault isolation code "4001-121" could correspond to a fault in a hydraulic reservoir that causes a loss in hydraulic pressure in the hydraulic system. If this type of fault is present, intelligent Lamm schematic 302 displays an interaction of each component in the cause-and-effect chain including the identified fault to reflect the loss of hydraulic pressure due to the identified fault.

A user can select to display intelligent Lamm schematic 302 including a fault by selecting a fault isolation code corresponding to the fault. A set of fault isolation codes may be presented to a user for selection in a menu or in a separate window. This set of fault isolation codes is a set of one or more fault isolation codes in these examples. A user may select a fault isolation code by entering a command in a command-driven interface, selecting the fault isolation code in the second window displaying fault isolation codes, clicking on a fault isolation code in a menu, or by any other known or available means for selecting a fault isolation code.

If I-Lamm controller 326 determines that a user has selected a fault isolation code, fault isolation 328 identifies the fault associated with the selected fault isolation code. I-Lamm controller 326 modifies intelligent Lamm schematic 302 to incorporate the identified fault. In other words, intelligent Lamm schematic 302 displays the hydraulic flow, mechanical movement, pneumatic flow, and electrical flow occurring when the identified fault occurs during operation of the commodity, rather than displaying the hydraulic flow, mechanical movement, and electrical flow occurring when the commodity is operating under normal conditions.

In this example, color picker 330 is a software component for modifying display formats of intelligent Lamm schematic 302. A user may use color picker 330 to select graphics colors used to depict electrical wiring, colors for mechanical parts and/or mechanical movement, and colors for hydraulic flow in intelligent Lamm schematic 302. In this manner, a user can select to highlight certain portions of intelligent Lamm schematic 302 that are of particular interest to the user.

In another embodiment, a user may also select an intelligence level. An intelligence level indicates the amount of intelligence, detail, and component interaction that will be shown by intelligent Lamm schematic 302. For example, a first intelligence level would display a schematic with various components highlighted. For instance and without limitation, wires and data buses may be highlighted in different colors. A second level may be used to generate intelligent Lamm schematic 302 showing changes in components when switches are opened and closed. A third level intelligence may be selected to display intelligent Lamm schematic 302 illustrating changes in all components in multiple interacting systems that are part of a cause-and-effect chain.

In other words, in this example, multimedia authoring program 322, such as Adobe® Flash® professional 8, is used as the environment for creating the animation, such as electrical, mechanical, and hydraulic animation of the cause-and-effect chain. Action script 324 is used to add a level of intelligence to the schematic. The intelligence level specifies the degree of detail and functionality provided by I-Lamm controller 326. Based on the level of intelligence selected by a user, I-Lamm controller 326 links the electronic schematic to external data, controls the cause-and-effect chain, provides the logic behind the sequence of events that takes place in the cause-and-effect chain, highlights wires, and plays the animation that multimedia authoring program 322 created.

FIG. 4 is an illustration of the components in an intelligent Lamm schematic in accordance with an advantageous embodiment. Intelligent Lamm schematic 400 may be an intelligent Lamm schematic, such as intelligent Lamm schematic 302 in FIG. 3. Intelligent Lamm schematic 400 displays and depicts all systems for a commodity as the systems interacts with one another during operation of the commodity in accordance with the schematics and/or fault isolation.

Intelligent Lamm schematic 400 includes a set of components 402, 408, 412, and 418.

Components 402, 408, 412, and 418 may be any type of component. Intelligent Lamm schematic 400 is not limited to depicting any single type of commodity, systems, components, or parts in intelligent Lamm schematic 400. Components 402, 408, 412, and 418 are depicted as blocks in this example in FIG. 4 to emphasize the fact that any type of component may be represented and depicted in Intelligent Lamm schematic 400.

In an actual intelligent Lamm schematic, a more accurate representation of a specific component may be shown. For example, the components depicted in FIG. 5 below provide an illustrative example of graphics representations of components in an exemplary illustration of an intelligent Lamm schematic for an aircraft type commodity.

Control component 402 is a component for initiating a cause-and-effect chain in a system. Control component 402 initiates a cause-and-effect chain in a system by changing state. A state change can include, without limitation, changing from an on position to an off position, changing a temperature, changing a pressure, changing a size or shape, changing a bit value from a zero to a one, changing a bit value from a one to a zero, or any other type of state change. These states may have more than one value. For example, the state may include, but is not limited to, a range of temperatures, pressures, sizes, or shapes.

For example, a light switch is a control component for initiating a cause-and-effect chain in an electrical system that ends in either turning a light on or turning a light off. When a state of the light switch changes, for example, from the off position to the on position, a cause-and-effect chain sends a current through an electrical system to a light bulb to generate light. Control component 402 can include a switch, valve, a signal, input, data, a command entered at a user interface, such as user interface 304 in FIG. 3, or any other type of hardware or software control device.

Effector components 408, 412, and 418 are components that change states. These types of components may perform a function or an action as part of a state change. Further, effector components 408, 412, and 418 may change states in response to other components, actions, lack of actions, or functions based on a function of the component and/or an interaction of the component with one or more other components. Effector components 408, 412, and 418 may include wire, pipe, hose, a mechanical device, a part, an assembly, a pump, an indicator light, or any other type of hardware or software component.

Interactions 406, 410, 414, and 416 indicate one component interacting in some manner with another in a cause-and-effect chain. The interaction may be any type of interaction, including without limitation, sending a signal, a flow of electrons from one component to another, transmission of a data packet, a mechanical movement, a flow of fluid through a pipe or hose, or any other interactions that propagate through the cause-and-effect chain.

Thus, in this example, control component 402 changes state which initiates a cause-and-effect chain. Control component 402 interacts 406 with effector component 408. Effector component 408 interacts 410 with effector component 412. In response, effector component 412 interacts 414 with effector component 408. Effector component 408 interacts 416 with effector component 418. Effector component 418 then performs or generates result 420. A result may be any type of desired or intended action or change in state, such as, for example, illuminating an indicator light, opening a cargo door, lowering landing gear, or any other type of movement, action, or change in state. For instance, without limitation, if effector component 418 is an indicator light on a cockpit control panel and effector component 408 is a component controlling the flow of electricity to effector component 418, effector component 418 may perform result 420 by turning on the indicator light in response to interaction 416 with effector component 408 delivering electricity to effector component 418.

Thus, in this example, intelligent Lamm schematic animates control component 402 to depict control component 402 changing state. When control component 402 changes state, the change in state initiates a cause-and-effect chain in the system. Intelligent Lamm schematic 400 animates interaction 406 between control component 402 and effector component 408. Intelligent Lamm schematic 400 then animates the changes in effector components 408 and 412 based on functions of effector components 408 and 412 and based on interactions 410 and 414. Intelligent Lamm schematic 400 then animates changes in effector component 418 occurring as a result of interaction 416 with effector component 408. Result 420 is a result of the conclusion of the cause-and-effect chain. In this example, result 420 is the turning on of an indicator light.

If a user selects a fault isolation code, intelligent Lamm schematic 400 will depict a cause-and-effect chain interrupted by the fault associated with the selected fault isolation code. Thus, in this example, if a user selects a fault associated with fault 422 occurring on or in association with effector component 412, intelligent Lamm schematic 400 will depict the changes occurring in control component 402 and effector component 408 as a result of interaction 406. Intelligent Lamm schematic 400 will then animate changes in effector component 412 occurring as a result of interaction 410 with effector component 408. However, due to fault 422, effector component 412 will have no interaction/incorrect interaction 424 with effector component 408. Thus, either no interaction or an incorrect interaction will occur between effector component 408 and 418. Therefore, result 420 will not occur.

A user can use fault isolation options in intelligent Lamm schematic 400 to identify what will occur if a particular fault occurs and surmise what step may be to repair or bypass the fault.

Figure 5B:
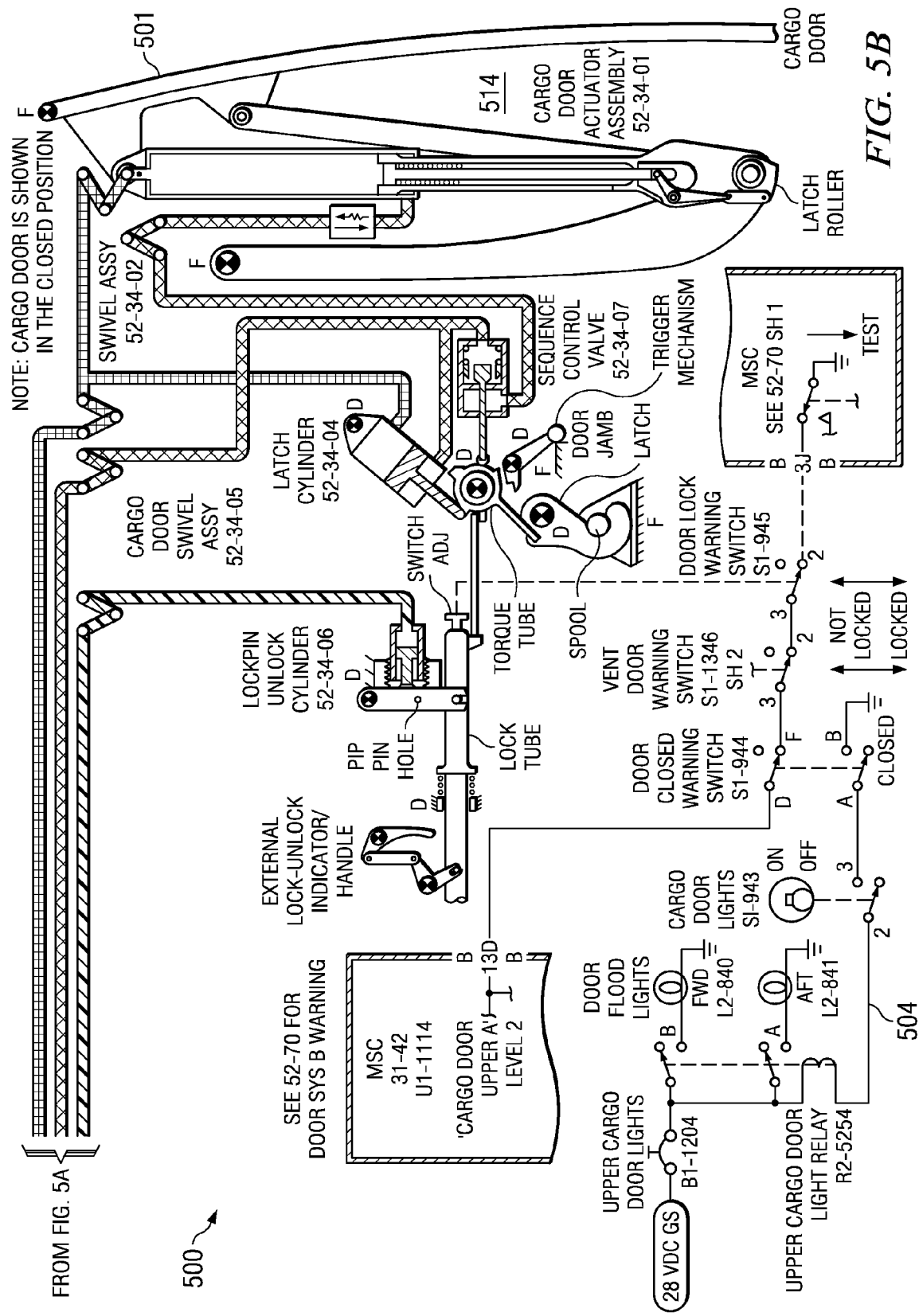
FIG. 5B is an illustration of an intelligent Lamm schematic for a cargo door on an aircraft in accordance with an advantageous embodiment.

FIGS. 5A and 5B is an illustration of an intelligent Lamm schematic for a cargo door on an aircraft in accordance with an advantageous embodiment. Intelligent Lamm schematic 500 is an intelligent Lamm schematic, such as intelligent Lamm schematic 302 in FIG. 3 and intelligent Lamm schematic 400 in FIG. 4. Intelligent Lamm schematic 500 is an example of an intelligent Lamm schematic for an aircraft cargo door system in an aircraft type commodity. Intelligent Lamm schematic 500 is only a single static image representation of what would be displayed in a single screen shot during an intelligent Lamm schematic display. For example, in this screen shot, intelligent Lamm schematic 500 is displaying a representation of cargo door 501 in a closed position.

If intelligent Lamm schematic 500 were actually being implemented, a user would be able to see movement through all operable components in the systems shown in intelligent Lamm schematic 500 when a state of a control component is changed to initiate opening of cargo door 501. For example, intelligent Lamm schematic 500 displays animation of electrons through electrical wiring 502 and 504, movement of fluid to and from hydraulic reservoir 506 through hydraulic pipes 508, 510, and 512, and movement of mechanical movement of assembly 514 and control valve 516.

Thus, intelligent Lamm schematic 500 provides a visualization of a system for opening and closing cargo door 501 on a single page and shows the interaction between all other systems affecting the system for opening and closing cargo door 501. In this example, a user may see depictions of fluid flow, cockpit indicators, electron flow, and mechanical movements of components in response to input from a user and in response to interaction with other components and systems.

Figure 6:
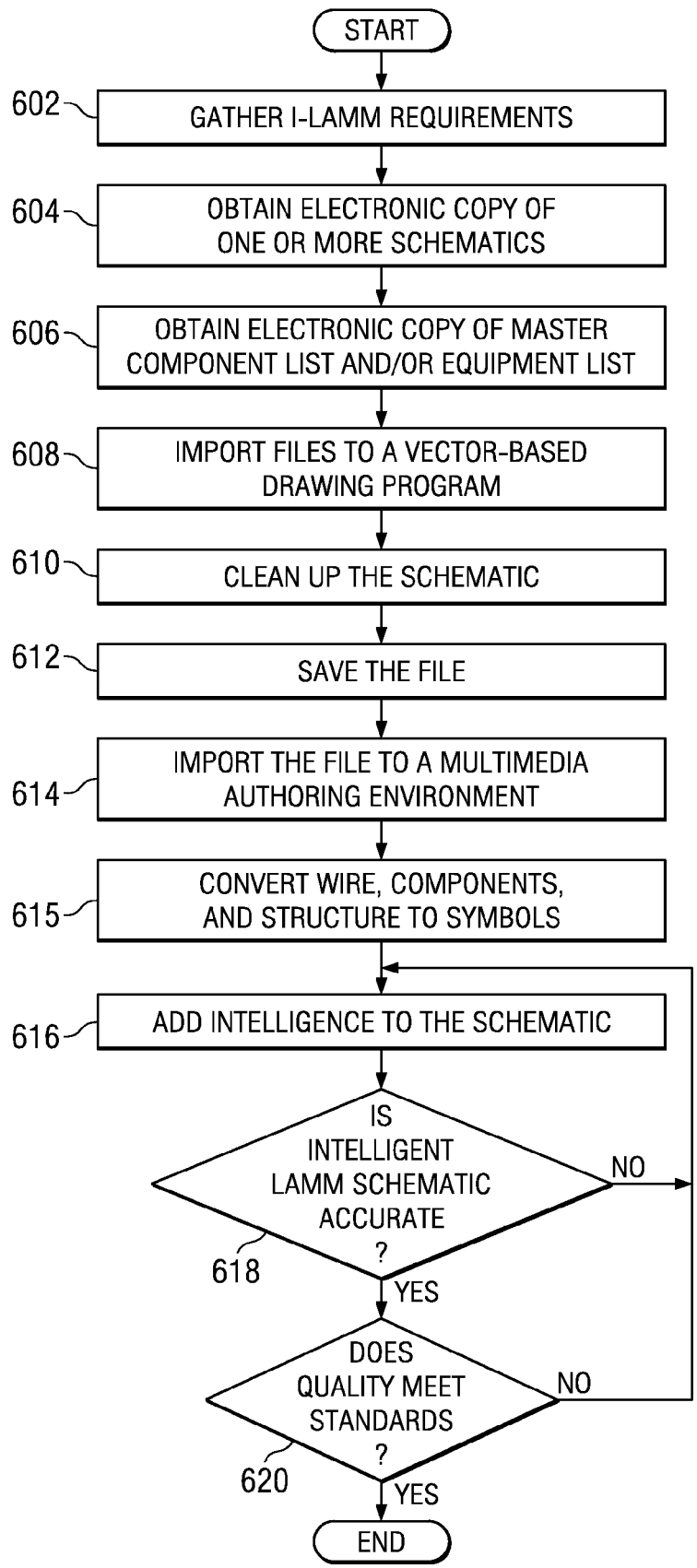
FIG. 6 is a flowchart of a process for generating an intelligent Lamm schematic for a commodity in accordance with an advantageous embodiment.

FIG. 6 is a flowchart of a process for generating an intelligent Lamm schematic for a commodity in accordance with an advantageous embodiment. The intelligent Lamm schematic may be an intelligent Lamm schematic, such as intelligent Lamm schematic 302 in FIG. 3, intelligent Lamm schematic 400 in FIG. 4, and/or intelligent Lamm schematic 500 in FIG. 5. The process is performed by a user. The process may be implemented in any type of general computing device. For example, the process in FIG. 6 may be implemented in computer 100 in FIG. 1 or computer 300 in FIG. 3. The intelligent Lamm schematic may be a schematic for any type of commodity, including, but not limited to, an aircraft type commodity.

The process begins when a user gathers requirements for the intelligent Lamm (I-Lamm) schematic (operation 602). Intelligent Lamm schematic requirements may include types of features that will be present in the intelligent Lamm schematic. Gathering intelligent Lamm schematic requirements may also include determining what, if any, fault isolation scenarios will be included in the intelligent Lamm schematic. This operation may also involve completing an estimate of costs, verifying the scope of the work, and establishing a schedule for completion of the intelligent Lamm schematic.

Next, an electronic copy of a set of one or more schematics to be used in generation of the intelligent Lamm schematic is obtained (operation 604). In this example, the schematics are Lamm schematics. However, any type of known or available schematics may be used. Electronic copies of schematics may be obtained from an illustrator of the schematics, a CD-ROM, a local database, a remote database accessed via a network, and/or any other source of electronic schematics. In accordance with an illustrative embodiment, a user may also enter schematic data for use in generation of an intelligent Lamm schematic manually based on a paper schematic. The electronic copy of the set of schematics may be saved in a file in a database for use in generating the intelligent Lamm schematic.

An electronic copy of a master component list (MCL) and/or an equipment list for the commodity is obtained (operation 606). The master component list and/or equipment list is a list of assemblies and parts associated with the commodity. The master component list and/or equipment list may include information regarding each assembly and/or parts. For example, the component list may include the parts, sub-parts, and nested sub-subparts of a given assembly. The component list may also include part numbers, commercial and government entity (CAGE) code data, and/or any other data related to a component or piece of equipment. The component list and/or equipment list may be stored in a file in a database for use in generating the intelligent Lamm schematic.

The file containing the set of schematics is imported to a vector-based drawing program, such as Adobe® illustrator (operation 608) where the set of schematics and/or component list is combined into a single schematic. The schematic is cleaned up and edited as necessary (operation 610). In other words, a drawing program is used to correct any problems with the electronic copy of the schematic. The file is saved in a database or other data storage device (operation 612).

The file is imported into a multimedia authoring environment (operation 614). In this example, the authoring environment is Flash® Professional 8. However, any multimedia authoring environment may be used in accordance with the illustrative embodiments.

Next, the multimedia authoring environment is used to convert each wire, component, and structure in the schematic to a symbol (operation 615). Intelligence is then added to the schematic (operation 616). This operation may be performed by adding an action script to the symbols representing various components in the schematic. An action script is a programming language for scripting movement and animation. However, any scripting programming language may be used to add intelligence to the schematic. The intelligence added may take the form of, but is not limited to, I-Lamm controller 326 in FIG. 3.

In this example, symbols for each component associated with the commodity are linked to external files or websites using action script. External files may include portable document format (PDF) documents, shockwave flash (SWF) files, or any other type of external file. The external files may include data relating to assemblies, sub-assemblies, parts, and sub-parts for the commodity. The external files may also include fault isolation data, CAGE codes, manufacturer information, and other data related to the commodity and the components of the commodity.

The scripting language, in conjunction with the authoring environment, may also be used to add depictions of real-time movement, such as hydraulic flow, mechanical movement, and flow of electrons through the electrical system illustrated by the schematic. Action script is used to add logic for the flow and fault scenarios depicted in the schematic.

A determination is made as to whether the intelligent Lamm schematic is accurate (operation 618). If the intelligent Lamm schematic is not accurate, the operation returns to operation 616. When the intelligent Lamm schematic is accurate, a determination is made as to whether the quality of the intelligent Lamm schematic meets the relevant quality standards (operation 620). If the quality does not meet the standards, the operation returns to operation 616. When the intelligent Lamm schematic does satisfy relevant standards, the process terminates thereafter.

FIG. 7 is a flowchart of a process for displaying an intelligent Lamm schematic in accordance with an advantageous embodiment. The process may be implemented by a software component for generating and displaying an intelligent Lamm schematic having real-time animation representing movement of hydraulic systems, mechanical system, and/or electrical systems for a given component. For example, the process may be implemented by I-Lamm controller 326 in FIG. 3.

The process begins when a selection to display an intelligent Lamm schematic for a given commodity is received (operation 702). A commodity may include a machine, device, piece of equipment or any part of a machine, device, or piece of equipment. For example, a commodity may include an aircraft. In another example, a commodity may only include a part or portion of an aircraft, such as the aircraft systems associated with opening and closing a hatch door.

A determination is made as to whether a selection of a fault isolation code is received (operation 704). If a fault isolation code is not received, an intelligent Lamm schematic for the commodity is shown without depicting an occurrence of a fault condition (operation 706), with the process terminating thereafter. For example, if the commodity is a portion of an aircraft associated with opening and closing a hatch door, the intelligent Lamm schematic is displayed illustrating a real time movement of electrons through electrical systems, hydraulics through hydraulic systems, and/or movement of mechanical parts occurring when a hatch door is opened and/or closed in accordance with the normally expected operation of the various systems. Using this process for displaying intelligent Lamm schematic, a user can see how the various systems on the aircraft interact and react as the hatch door is opened and/or closed. In this manner, a user can view a real-time animation of hydraulic flow, electrical flow, and mechanical movement in a commodity when the commodity is functioning correctly and/or in an expected manner in accordance with the specifications for the commodity.

Returning to step 704, if a selection of a fault isolation code is received, the fault is identified based on the fault identification code (operation 708). The intelligent Lamm schematic is presented with an inclusion of animation representing the occurrence of the identified fault (operation 710) with the process terminating thereafter. In this manner, a user can view a real-time animation of hydraulic flow, electrical flow, and mechanical movement in a commodity when the commodity is not functioning correctly in accordance with the specifications for the commodity due to an identified fault occurrence.

In other words, the movement of mechanical parts, hydraulic flow, and/or electrical flow is depicted as the mechanical part, hydraulic flow, and electrical flow would normally be expected to occur up to the point of the identified fault. At the point of the identified fault, the intelligent Lamm schematic depicts the movement of mechanical parts, hydraulic flow, and/or electrical flow occurring as a result of the fault. For example, if a fault prevents a fuel hose from retracting, as would be expected in the absence of the fault, the intelligent Lamm schematic will depict the failure of the fuel hose to retract and any other changes in the commodity that would be expected to occur in the cause-and-effect relationship between various interacting systems as a result of the fault.

Thus, the advantageous embodiments provide a computer implemented method and computer usable program code for interacting with a system schematic. A system schematic having a set of effector components of the system is graphically displayed. A control component of the system is selected. A state of the control component is altered. A set of operable effector components from the set of effector components that are operable based on the selected control component and a cause-and-effect relationship between the control component and the set of operable effector components are animated. Moreover, intelligent Lamm schematics of the illustrative embodiments are compatible with interactive electronic technical manuals (IETMs) and network-centric operations (NCO).

Thus, intelligent Lamm schematics provide users with a common understanding of the various systems on an aircraft or other commodity and how the systems interact and function together in real-time during operation of the commodity under both normal conditions and during a fault occurrence. Normal conditions are conditions in which the commodity operates in accordance with specifications. A fault occurrence is any occurrence which prevents the commodity from operation in accordance with the specifications for the commodity.

The intelligent Lamm schematic provides a view of a system interacting with all of the other systems. A user can build in failure from fault isolations and see how a given fault affects the various systems. In other words, a user can watch the malfunction and see how the malfunction impacts the system. Therefore, the user can more efficiently troubleshoot a system malfunction and determine immediately what will be required to repair the system based on the intelligent Lamm schematic depiction of the fault occurrence and the affect of the fault on the components in the cause-and-effect chain including the fault.

The intelligent Lamm schematic can also be used to understand design problems before manufacture of a commodity even begins. For example, the intelligent Lamm schematic can provide a real-time illustration of the operation and interaction of all the components and assemblies within a commodity based on design specifications before the commodity is actually manufactured.

For example, an intelligent Lamm schematic can depict a problem in the design specifications that would result in a fuel hose failing to be cut within a minimum amount of time. Based on the information presented in the intelligent Lamm schematic, a designer can quickly determine that modification of the design will be required to reduce the amount of time required to cut the fuel hose. Thus, errors in a system design can be seen immediately during the design phase.

Intelligent Lamm schematics can be used to decrease the amount of time a user is required to take to become familiar with a system. Intelligent Lamm schematics can also be used to decrease training time and repair time. In this manner, the intelligent Lamm schematic is a valuable tool for use during all phases of a commodities life cycle, from the design phase before manufacture and through maintenance and trouble shooting of the commodity during the commodities entire operational life. Reducing familiarization time, training time, and troubleshooting time decreases design and maintenance costs, thereby saving customers' money.

The flowcharts and block diagrams in the different depicted embodiments illustrate the architecture, functionality, and operation of some possible implementations of apparatus, methods and computer program products. In this regard, each step in the flowchart or block diagrams may represent a module, segment, or portion of code, which comprises one or more executable instructions for implementing the specified function or functions. In some alternative implementations, the function or functions noted in the step may occur out of the order noted in the figures. For example, in some cases, two steps shown in succession may be executed substantially concurrently, or the steps may sometimes be executed in the reverse order, depending upon the functionality involved.

The description of the disclosure has been presented for purposes of illustration and description, and is not intended to be exhaustive or limited to the embodiments disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the disclosure, the practical application, and to enable others of ordinary skill in the art to understand the disclosure for various embodiments with various modifications as are suited to the particular use contemplated.

What is claimed is:

1. A computer implemented method for displaying a system schematic, the computer implemented method comprising:
    graphically displaying the system schematic having a plurality of components, wherein the system schematic includes a set of schematics;
    responsive to a selection of a control component from the plurality of components, altering a state of the control component; and
    animating, by a processor unit, a set of effector components from the plurality of components using a cause-and-effect relationship between the control component and the set of effector components.

2. The computer implemented method of claim 1 further comprising:
    configuring display parameters for the system schematic.

3. The computer implemented method of claim 2 wherein configuring display parameters for the system schematic further comprises:
    identifying an intelligence level of the schematic.

4. The computer implemented method of claim 1 further comprising:
    animating the selected control component of the system schematic.

5. The computer implemented method of claim 1 further comprising:
    selecting a predetermined fault condition of the system schematic.

6. The computer implemented method of claim 1 wherein animating the set of effector components further comprises:
    animating a flow of electrical conductivity through an electrical system.

7. The computer implemented method of claim 1 wherein animating the set of effector components further comprises:
    animating mechanical movement in the system schematic.

8. The computer implemented method of claim 1 wherein animating the set of effector components further comprises:
    animating pneumatic flow and fluid flow through the system schematic.

9. The computer implemented method of claim 1 wherein the set of effector components includes any component that is affected through the cause-and-effect chain associated with the cause-and-effect relationship.

10. A computer program product comprising:
    a computer usable medium including computer usable program code for displaying a system schematic, said computer program product comprising:
    computer usable program code for graphically displaying the system schematic having a plurality of components, wherein the system schematic includes a set of schematics;
    computer usable program code for altering a state of a control component in response to receiving a selection of the control component from the plurality of components; and
    computer usable program code for animating a set of effector components from the plurality of components that are operable based on a function of the selected control component and a cause-and-effect relationship between the control component and the set of effector components.

11. The computer program product of claim 10 further comprising:
    computer usable program code for configuring display parameters for the system schematic.

12. The computer program product of claim 11 wherein configuring display parameters for the system schematic further comprises:
    computer usable program code for identifying an intelligence level of the schematic.

13. The computer program product of claim 10 further comprising:
    computer usable program code for animating the selected control component of the system schematic.

14. The computer program product of claim 10 further comprising:

computer usable program code for selecting a predetermined fault condition of the system schematic.

15. The computer program product of claim 10 wherein animating the set of effector components further comprises:
   computer usable program code for animating a flow of electrical conductivity through an electrical system.

16. The computer program product of claim 10 wherein animating the set of effector components further comprises:
   computer usable program code for animating mechanical movement in the system schematic.

17. The computer program product of claim 10 wherein animating the set of effector components further comprises:
   computer usable program code for animating pneumatic flow and fluid flow through the system schematic.

18. The computer program product of claim 10 wherein the set of effector components includes any component that is affected through a cause-and-effect chain associated with the cause-and-effect relationship.

19. A computer implemented method for an intelligent Lamm schematic for a system, the computer implemented method comprising:
   graphically displaying a plurality of components for the system;
   receiving user input selecting a first component of the plurality of components, wherein selecting the first component initiates a cause-and-effect chain through a set of components in the plurality of components;
   animating the first component based on a function of the first component using a processor unit;
   animating a second component of the set of components based on a function of the second component and an interaction between the first component and the second component; and
   animating a next component in the set of components based on a function of the next component and an interaction of the next component with one or more other components in the set of components until all components in the cause-and-effect chain are animated.

20. The computer implemented method of claim 19 further comprising:
   receiving a selection of a fault isolation code;
   identifying a fault in a component associated with the selected fault isolation code to form a fault component;
   animating the fault component in accordance with a function of the fault component, the identified fault, and an interaction of the fault component with one or more other components, wherein animating the fault component represents a fault occurrence; and
   responsive to animating the fault component, animating a next component in the set of effector components based on the function of the next component and a result of the fault occurrence.

* * * * *